United States Patent [19]
Faykish et al.

[11] Patent Number: 5,866,236
[45] Date of Patent: *Feb. 2, 1999

[54] ARTICLE WITH HOLOGRAPHIC AND RETROREFLECTIVE FEATURES

[75] Inventors: Lynn E. Faykish, Minneapolis, Minn.; Shih-Lai Lu, Taipei, Taiwan

[73] Assignee: Minnesota Mining and Manufacturing Company, St. Paul, Minn.

[ * ] Notice: The term of this patent shall not extend beyond the expiration date of Pat. No. 5,656,360.

[21] Appl. No.: 850,911

[22] Filed: May 5, 1997

Related U.S. Application Data

[62] Division of Ser. No. 602,637, Feb. 16, 1996, Pat. No. 5,656,360.

[51] Int. Cl.⁶ ................................................. B32B 3/00
[52] U.S. Cl. ..................... 428/195; 428/201; 428/204; 428/207; 428/209; 428/156; 428/161; 428/172; 428/354; 428/457; 428/913; 283/85; 359/529
[58] Field of Search ........................... 428/195, 323, 428/402, 402.24, 403, 457, 913, 156, 161, 172, 201, 204, 207, 209, 343, 354; 283/85; 359/529; 156/60

[56] References Cited

U.S. PATENT DOCUMENTS

| | | | |
|---|---|---|---|
| 2,407,680 | 9/1946 | Palmquist et al. | 88/82 |
| 3,700,305 | 10/1972 | Bingham | 350/105 |
| 3,801,183 | 4/1974 | Sevelin et al. | 350/105 |
| 3,993,401 | 11/1976 | Strehlow | 350/320 |
| 4,036,552 | 7/1977 | Lee et al. | 350/97 |
| 4,082,426 | 4/1978 | Brown | 350/105 |
| 4,095,875 | 6/1978 | Lee et al. | 350/320 |
| 4,200,875 | 4/1980 | Galanos | 346/1.1 |
| 4,368,979 | 1/1983 | Ruell | 356/71 |
| 4,576,850 | 3/1986 | Martens | 428/156 |
| 4,684,795 | 8/1987 | Colgate, Jr. | 235/457 |
| 4,688,894 | 8/1987 | Hockert | 350/105 |
| 4,856,857 | 8/1989 | Takeuchi et al. | 350/3.6 |
| 4,968,063 | 11/1990 | McConville et al. | 283/72 |
| 5,066,047 | 11/1991 | Mailloux et al. | 283/86 |
| 5,153,042 | 10/1992 | Indrelie | 428/40 |
| 5,169,707 | 12/1992 | Faykish et al. | 428/195 |
| 5,237,164 | 8/1993 | Takada | 235/487 |
| 5,510,171 | 4/1996 | Faykish | 428/195 |
| 5,742,411 | 4/1998 | Walters | 359/2 |

FOREIGN PATENT DOCUMENTS

| | | |
|---|---|---|
| 0 175 513 | 3/1986 | European Pat. Off. . |
| 0 404 539 | 12/1990 | European Pat. Off. . |
| 0 660 292 | 6/1995 | European Pat. Off. . |
| 43 14 579 | 8/1994 | Germany . |
| 5-42466 | 10/1993 | Japan . |
| WO 93/25941 | 12/1993 | WIPO . |
| WO 97/19820 | 6/1997 | WIPO . |
| WO 97/40464 | 10/1997 | WIPO . |

*Primary Examiner*—Marie Yamnitzky
*Attorney, Agent, or Firm*—Peter L. Olson

[57] ABSTRACT

An article is disclosed having both holographic and retroreflective features. The article includes a holographic layer that is perceptible under normal lighting conditions and substantially imperceptible to the unaided eye under retroreflective lighting conditions, a retroreflective layer perceptible under retroreflective lighting conditions, and means for bonding the two layers together.

19 Claims, 1 Drawing Sheet

ARTICLE WITH HOLOGRAPHIC AND RETROREFLECTIVE FEATURES

This is a division of application Ser. No. 08/602,637 filed Feb. 16, 1996, now U.S. Pat. No. 5,656,360.

FIELD OF THE INVENTION

The invention relates to articles having both holographic features that are visible under normal lighting conditions, for providing decoration or an indication of authenticity, and retroreflective features that are visible under retroreflective lighting conditions.

BACKGROUND OF THE INVENTION

A variety of security articles are known in the art. For example, U.S. Pat. No. 5,169,707 (Faykish et al.) discloses a retroreflective security article with dual level verification. Included are primary legends that are visible under both ordinary diffuse lighting conditions and under retroreflective lighting conditions, and "retrolegends" that are viewable only under retroreflective viewing conditions. Thus, the primary legend provides a first level of screening or verification under ordinary diffuse lighting conditions, without special equipment. The retro-legends provide a second level of verification under retroreflective lighting conditions, and thus a higher degree of security for the article as a whole. Although the security articles disclosed in the '707 patent have their own utility, they share certain limitations. Specifically, the primary legend remains visible under retroreflective lighting conditions, which can obscure the retro-legends. Also, the articles disclosed in the '707 patent are necessarily transparent, so that they may be used over documents such as driver's licenses, title documents, and passports.

Another conventional security article is disclosed in U.S. Pat. No. 4,368,979 (Ruell) discloses an automobile identification system including a license plate having alphanumeric characters perceptible to the unaided eye, and a hologram that provides encoded identifying information that cannot be decoded by the unaided eye. Although this, too, can be a useful product for some applications, the fact that an unaided eye cannot decode the holographic information renders the system more expensive, and correspondingly less useful for some applications.

In view of the disadvantages associated with these and other known articles, such as those disclosed in U.S. Pat. Nos. 3,993,401 (Strehlow), 4,036,552 (Lee et al.), and 4,095,875 (Lee et al.), it is desirable to provide an article having both holographic and retroreflective features, wherein the hologram does not visually interfere with the retroreflective feature.

SUMMARY OF THE INVENTION

The article of the present invention provides enhanced visual recognition features and improved visual appeal, due to the presence of both holographic and retroreflective elements. The inventive article may be used in a variety of applications, such as a security label for a vehicle window, bumper, or license plate, consumer products, identification cards, documents, a tamper-evident seal film, or a sheeting for marking bikes, helmets, clothing, traffic signs, license plates, and people to improve identification under retroreflective conditions.

In one embodiment, the article includes a holographic layer that is perceptible under normal lighting conditions and substantially imperceptible to the unaided eye under retroreflective lighting conditions, a retroreflective layer perceptible under retroreflective lighting conditions, and means for bonding the retroreflective and holographic layers together. Other optional layers may also be included, such as a cover film, a tie layer, an adhesive layer, a heat-shrink layer, a patterned coating layer with differential adhesion, and indicia patterns.

BRIEF DESCRIPTION OF DRAWINGS

The invention will be described herein with reference to the appended drawings, in which.

DETAILED DESCRIPTION OF THE INVENTION

The article of the present invention comprises a holographic layer that is visible under normal lighting conditions but is substantially imperceptible to the unaided eye under retroreflective lighting conditions, and a retroreflective layer that is visible under retroreflective lighting conditions. As used herein, the term "normal lighting conditions" refers to the presence of ambient light that is substantially diffused, as with light typically used to light a room. The term "retroreflective lighting conditions" refers to the presence of ambient light that is substantially collimated, as with the light cast by the headlight of an automobile, or by a flashlight. The term "unaided eye" means normal (or corrected to normal) human vision not enhanced by, for example, magnification.

To facilitate a complete understanding of the various aspects of the inventive article, the general construction of the article will be described, followed by descriptions of specific layers, a description of suitable methods for making the article, and several illustrative Examples.

I. General Construction

The article of the present invention includes a holographic layer, which is preferably a microstructured holographic layer, and a retroreflective layer, which preferably comprises either microspheres or cube corner elements. The article may also include other layers, such as a cover film for protecting the article, a tie layer for bonding the layers of the article together, an adhesive for bonding the article to the surface of an object, a heat-shrink layer for preventing a person from tampering with the article by applying heat, a patterned coating layer with differential adhesion for providing an indication of tampering by delamination, and additional indicia visible under various lighting conditions.

II. Holographic Layer

Figure 1:
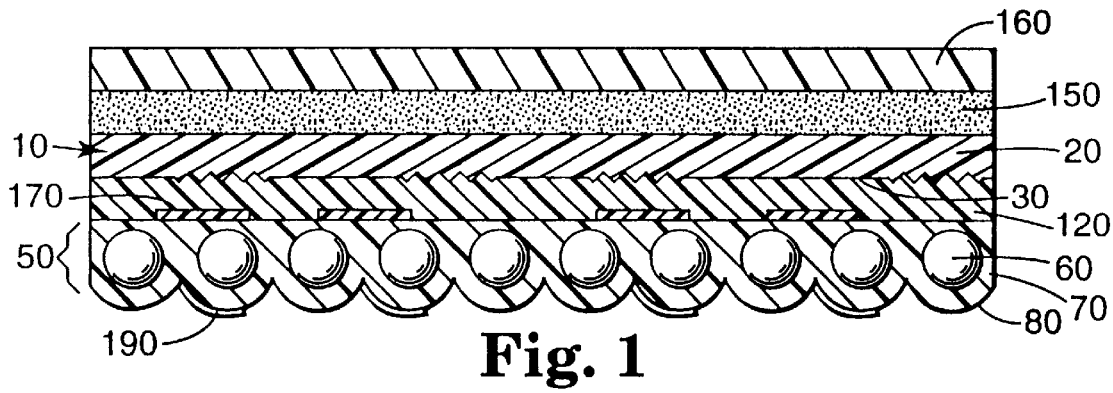
FIG. 1 is a cross-sectional view of an embodiment of the inventive article, including an enclosed microsphere-type retroreflective layer.

As shown in FIG. 1, the holographic layer 10 comprises two parts: a structured layer 20 and an optional reflective layer 30. The structured layer can be formed by several methods that are well known in the art, as disclosed in U.S. Pat. No. 4,856,857 (Takeuchi et al.), the contents of which is incorporated by reference herein. It may be made of materials such as polymethyl methacrylate, nitrocellulose, and polystyrene. The structured layer includes a microstructured relief pattern of holographic or diffraction grating images in the form of logos or patterns that reflect light. In one embodiment, an embossed microstructured layer may be formed by contacting the material from which the structured layer will be made with a non-deformable embossing plate having a microstructured relief pattern, and applying heat and pressure. Alternatively, the structured layer may be made by any other suitable process, such as radiation curing, and may be made of materials such as urethane, epoxy, polyester, and acrylate monomers and oligomers, which are formulated with photoinitiators, cast on a non-deformable tool having a microstructured relief pattern, and radiation cured.

The optional reflective layer 30 is coated on the structured layer 20 either before or after embossing. The reflective layer preferably has a higher refractive index than the structured layer. In a preferred embodiment, the reflective layer is substantially transparent and colorless. Illustrative examples of suitable reflective layer materials include but are not limited to bismuth trioxide, zinc sulfide, titanium dioxide, and zirconium oxide, which are described in U.S. Pat. No. 4,856,857 (Takeuchi et al.). Less transparent materials such as thin aluminum or silver, or patterned reflectors can also be used. The reflective layer enhances the reflection of light through the structured layer due to the difference in refractive index between the structured and reflective layers. Thus, the structured holographic pattern is more readily visible to the unaided eye once the reflective layer is coated on the structured layer, and an adhesive can be directly applied to the structured layer without diminishing the visibility of the structured pattern.

III. Retroreflective Layer

Retroreflective layer 50 may comprise one or more types of retroreflective materials, including microsphere-type retroreflective materials and cube corner-type retroreflective materials. As shown in FIG. 1, retroreflective layer 50, as disclosed in U.S. Pat. No. 2,407,680 (Palmquist et al.), may comprise an enclosed monolayer of glass microspheres 60, which are coated in a spacing resin 70 comprising, for example, polyvinyl butyral or polyester. The spacing resin conforms to the microspheres. A reflector layer 80 underlies spacing resin 70, and may comprise opaque materials such as silver, aluminum, chromium, nickel, or magnesium, or transparent high-index reflector materials such as those described above for use on the holographic structured layer, such as zinc sulfide, or multilayer reflectors as described in U.S. Pat. No. 3,700,305 (Bingham). Thus, light that enters the retroreflective layer is focused by the glass microspheres through the spacing resin, and reflected by the reflector layer back through the spacing resin and glass microspheres to an observer.

Figure 2:
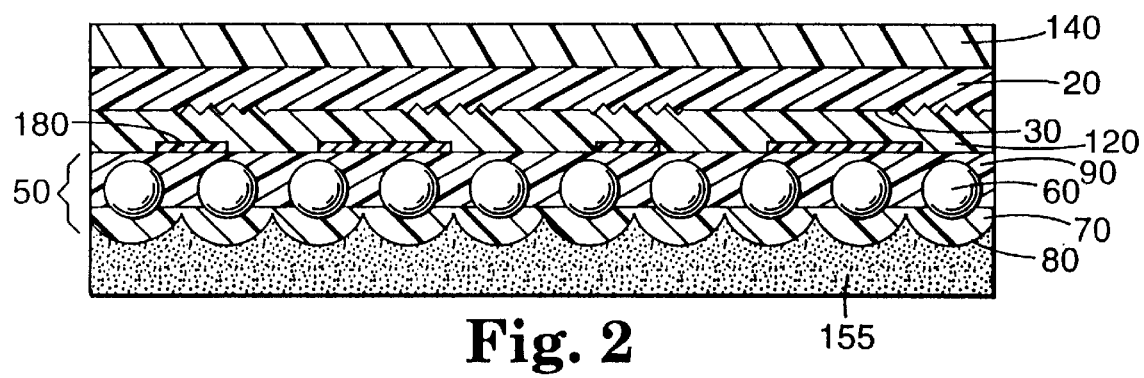
FIG. 2 is a cross-sectional view of a second embodiment of the inventive article, also including an enclosed microsphere-type retroreflective layer.

As shown in FIG. 2, an optional beadbond layer 90 may also be provided. In that embodiment, the glass microspheres 60 are coated onto the beadbond layer 90, and then the spacing resin 70 is coated onto the glass microspheres. The beadbond layer may contain a colored pigment (including black pigment) that gives the retroreflective material a colored appearance in normal light, and the appearance of a different color, such as silver, in retroreflective light. This is described further in U.S. Pat. No. 2,407,680 (Palmquist et al.).

Figure 3:
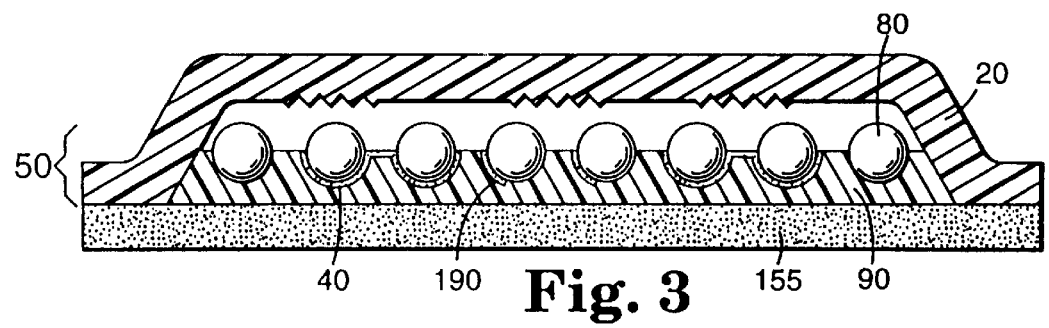
FIG. 3 is a cross-sectional view of a third embodiment of the inventive article, including an encapsulated microsphere-type retroreflective layer.

FIG. 3 illustrates an alternate retroreflective layer 50, as disclosed in U.S. Pat. No. 3,801,183 (Sevelin et al.), comprising an exposed monolayer of glass microspheres 60, and indicia pattern 40 printed on the back surface of the microspheres, a reflector layer 80 on the back surface of the printed indicia and the glass microspheres, and a beadbond layer 90. A holographic structured layer 20 without a reflector could be sealed over this retroreflective layer to an adhesive film 155 to provide an air gap between the structured layer and the microspheres for both holographic visibility and retroreflection.

Figure 4:
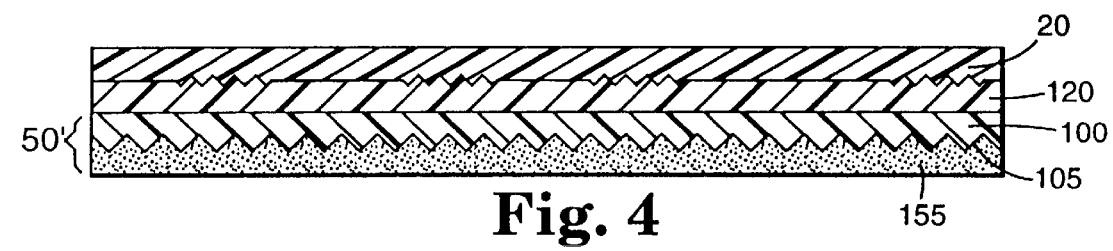
FIG. 4 is a cross-sectional view of a fourth embodiment of the inventive article, including a cube corner-type retroreflective layer.

As shown in FIG. 4, retroreflective layer 50' may include a multiplicity of cube-corner retroreflective elements 100, instead of glass micro spheres and resin, that may be made of materials such as vinyl, polycarbonate, or acrylic for embossed cube-corner retroreflective elements, and urethane, epoxy, polyester, and acrylate oligomers and monomers for radiation-cured cube-corner retroreflective elements. The cube-corner elements typically have three mutually perpendicular faces with surface areas of between approximately $1.9 \times 10-3$ mm2 to 0.1 mm2. Cube-corner retroreflective elements can be embossed by a master mold into a sheeting material under suitable temperature and pressure. The elements may also be created by coating a radiation-curable resin onto a master mold, laminating an overlay film under sufficient pressure, and solidifying the resin by curing it with radiation.

Cube-corner retroreflective elements 100 may optionally have a reflective coating 105, as shown in FIG. 4. The reflective coating may be made of the same materials as those previously described for microsphere retroreflective material, and is typically applied on the back surfaces of the cube corners so that an adhesive or film 155 can be directly applied to the cube corners and still allow retroreflection. Also, the cube corner retroreflective elements can be used without a reflective coating, and possibly attached to clothing articles by sewing or seating the edges to provide an air gap.

IV. Additional Layers

The holographic layer and the retroreflective layer are typically bonded together by a tie layer 120, such as that shown in FIG. 2. Suitable materials for such a tie layer include primers or adhesives, as either a coating or a film, such as urethanes, olefins, vinyls, and acrylics. The tie layer may be any appropriate thickness, and may be applied either to the holographic layer or to the retroreflective layer, or both, prior to bonding those two layers together to make the inventive article.

The tie layer 120 shown in FIG. 2 may be made of a heat-shrink material. In that embodiment, the heat-shrink layer provides protection against tampering by the application of heat, because the application of a sufficient level of heat causes the heat-shrink layer to deform. The deformed heat-shrink layer causes the article to deform, and thus provides an indication of tampering. Polyolefin film is a preferred material for the heat-shrink layer, and may also be used in the article as a cover film, tie layer, and adhesive.

A durable cover film 140 may also be provided, as shown in FIG. 2, to protect the article from degradation due to environmental conditions. The cover film may be either a film, including but not limited to polyester, polyvinyl chloride, polyolefin, polycarbonate, or cellulose acetate, or a coating such as an abrasion resistant or durable coating. The cover film may be of any suitable thickness, depending on requirements for tamper resistance and durability for indoor and outdoor applications.

For applications in which the article will be bonded to a surface, a facing layer of adhesive 150 may be provided at the light-entrant surface of the article, as shown in FIG. 1, or an attachment adhesive 155 may be located at the bottom of the article, as shown in FIG. 2. Adhesives may include pressure sensitive adhesives, such as acrylics, or heat-activated adhesives, such as polyolefins, polyesters, urethanes, and vinyls. These adhesives are useful for applying the article to plastic, paper, photographs, metal, glass, fabric, and other surfaces, and the amount and type of adhesive may be selected as known in the art to provide the adhesion features desired. Adhesives 150 and 155 may be covered by a removable liner 160, as shown in FIG. 1, to protect the adhesive from contamination prior to application of the article to a surface.

As shown in FIG. 1, an optional patterned coating layer 170 that either increases or decreases adhesion may also be provided to aid in detecting tampering. The patterned coating layer may be provided at or near the interface of the cover film and holographic layers, or at or near the interface of the holographic and retroreflective layers. A particularly useful application of a patterned coating layer is one in which that layer is used adjacent a layer having printed indicia or an arrangement of one or more holographic emblems. When the article is delaminated at the patterned coating layer, a portion of the printed indicia or emblem(s) remains bonded to each delaminated portion. Thus, an observer can more easily detect whether, and where, someone has tampered with the article.

An optional indicia pattern 180, as shown in FIG. 2, can be applied in the same locations as the patterned coating layer described above, or in other locations within the construction. The indicia pattern or logos are preferably printed with colored inks, pearlescent inks, or inks visible under ultraviolet light or imaged using toners or dyes in a pattern. These colored indicia are especially useful when printed at some location above the front surface of the retroreflective layer shown in FIG. 2, which has a colored beadbond. In normal light, the colored (preferably black) beadbond hides the colored indicia and only the hologram is typically visible, because the hologram detracts from the visibility of the colored indicia. However, under retroreflective lighting conditions, the colored indicia is brightly visible against the background, which is preferably silver, and the hologram is no longer visible. Angular indicia 190, as shown in FIGS. 1 and 3, may also be imaged onto the microsphere retroreflective layers according to the laser imaging process described in U.S. Pat. Nos. 4,688,894 (Hockert) and 4,200,875 (Galanos). Usually, when this process is used to image enclosed microsphere retroreflective materials with opaque reflectors, or exposed microspheres with transparent reflectors, the indicia are visible in both normal and retroreflective light. In this invention, using enclosed microsphere retroreflective material with transparent reflectors, the indicia are not visible in normal light but are visible only under retroreflection, thus the indicia are hidden until viewed under retroreflective lighting conditions. Also, the angular indicia that are usually visible in normal light can effectively be hidden under normal lighting conditions by using a distracting holographic image over the retroreflective sheeting.

Figure 5:
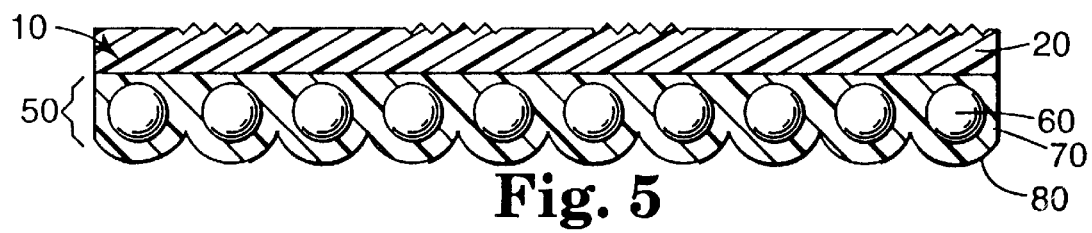
FIG. 5 is a cross-sectional view of a fifth embodiment of the inventive article, including an enclosed microsphere-type retroreflective layer.

In FIG. 5, a holographic layer 10 with a structured layer 20 without reflectors can be provided over a retroreflective layer 50. The microstructured holographic image does not require a reflector if it is exposed to air and is not laminated to another layer.

V. Method of Manufacturing

A preferred method of manufacturing the inventive article is to prepare the holographic and retroreflective portions separately, and then bond those portions together. The holographic layer may either be prepared by embossing, or by any other suitable process as is known in the art. The retroreflective layer may be prepared as previously described, and may include either cube corner elements, or glass microspheres, as is also known in the art.

To bond the holographic and retroreflective layers together, a conventional laminating process may be used. Heat and pressure are used to laminate the layers together with a heat-activated tie layer. Also, if the materials of the holographic and retroreflective layers are compatible, the layers can be bonded without using a tie layer. The layers can either be laminated using continuous contact, such as using a solid steel hot roll, or sealed around the edges to provide an air gap between the holographic and retroreflective layers. Alternatively, pressure lamination can be used if the tie layer is a pressure sensitive adhesive.

VI. Examples

The invention will be further explained by the following illustrative Examples.

Example One

A transparent article with visible holographic logos, and with hidden angular logos only visible under retroreflective lighting conditions, was prepared as follows. An enclosed microsphere transparent retroreflective article of the type described in U.S. Pat. No. 5,169,707 (Faykish et al.) was used, and comprised a polyethylene-based tie layer, a slurry of glass microspheres with polyvinyl butyral spacing resin behind the microspheres, a transparent zinc sulfide reflector on the resin, and a polyolefin adhesive layer.

The article was angularly imaged with a neodymium:yttrium aluminum garnet (Nd:YAG) laser using a process similar to that described in U.S. Pat. No. 4,688,894 (Hockert). The laser power level was adjusted to about 80 mJ/cm2, with a pulse rate of about 10 pulses per second, and used to image the front of the article through a mask in the shape of a 1.0 cm diameter logo at an angle perpendicular to the article. A transparent hologram film, available from the Crown Roll Leaf Company of Paterson, New Jersey under the designation XPT, consisting of a polyester cover film, a polystyrene-based structured layer, and a high-index zinc sulfide reflector was applied to the front of the retroreflective article using an acrylic pressure sensitive adhesive available from the 3M Company of St. Paul, Minn. under the designation pressure sensitive adhesive 966.

Only the holographic logos were visible under normal lighting conditions; the angular logos were substantially imperceptible to the unaided eye. Under retroreflective lighting conditions, the hologram was no longer visible, but the angular logos were bright gold and contrasted with the blue retroreflective background at an angle perpendicular to the article. When the article was viewed at an angle apart from the perpendicular under retroreflective lighting conditions, the logos were no longer visible; only a continuous blue background was visible. A simplified construction in accordance with this Example would consist of a structured holographic layer, a high-index reflective layer, a tie layer, a bead/resin slurry, a reflector, and an adhesive which could be imaged by a laser through the front side of the article.

This transparent material could be used as a security article over printed documents, or as a label to protect articles. A pressure sensitive adhesive layer could be applied to the front face of the material for use as a transparent label inside windows, which would cause minimal distraction of visibility though the window.

Example Two

An opaque article with visible holographic and colored logos and with hidden angular logos visible only under retroreflective lighting conditions was prepared as follows. An enclosed microsphere opaque retroreflective sheeting was used, consisting of a slurry of microspheres with polyvinyl butyral spacing resin behind the microspheres, an opaque aluminum reflector on the resin, and an acrylic pressure sensitive adhesive layer. This construction is available from the 3M Company of St. Paul, Minn. under the designation 3750 sheeting. The front of the sheeting was printed with red, blue, and black colored logos. The sheeting had also been imaged at an angle apart from the perpendicular with a laser using a process similar to that described in U.S. Pat. No. 4,200,875 (Galanos). The transparent hologram described in Example One was applied to the front of the retroreflective sheeting using a pressure sensitive adhesive.

The holographic logos were visible under normal lighting conditions, and did not distract from the visibility of the colored logos, but the angular logos were partially hidden by the holographic logos because the hologram detracted from their visibility. Under retroreflective lighting conditions, the hologram was no longer visible, but the colored logos were brightly visible against the silver retroreflective background. When the sheeting was viewed at an angle apart from the perpendicular under retroreflective lighting conditions, the angular logos were visible as black over the silver retroreflective background.

This article could be used as a label to protect articles, or with a face adhesive for application to a window. The article could also be used as a license plate sheeting, because the entire area retroreflects under the holographic image. A smaller label of the transparent hologram described in Example 1 could be applied as a validation label over a portion of a retroreflective license plate.

Example Three

An opaque article with visible holographic logos, and with hidden colored logos only visible under retroreflective lighting conditions was prepared as follows. An enclosed microsphere retroreflective sheeting that appeared black under normal light and silver under retroreflective lighting conditions, as described in U.S. Pat. No. 2,407,680 (Palmquist et al.), was used. It consisted of a clear vinyl top film, glass microspheres dispersed in black resinous beadbond, a polyvinyl butyral spacing resin behind the microspheres, an aluminum reflector on the resin, and an acrylic pressure sensitive adhesive layer. The front of the sheeting was printed by hand with colored logos using red, blue, and black permanent marking pens. The transparent hologram described in Example One was applied to the front of the retroreflective sheeting using a pressure sensitive adhesive.

Only the holographic logos were visible under normal lighting conditions, and the colored logos were substantially imperceptible to the unaided eye. Under retroreflective lighting conditions, the hologram was no longer visible, but the colored logos were brightly visible on the silver retroreflective background. The angular imaging methods from Examples 1 & 2 could be used to provide hidden angular logos only visible under retroreflective lighting conditions.

Example Four

An article was made using tamper-indicative film of the type described in U.S. Pat. No. 5,153,042 (Indrelie) to improve the tamper-resistance of the construction, consisting of a polyester cover layer, a patterned release coating, and a polyester resin primer layer. A hologram having a structured layer and a high-index zinc sulfide reflector was applied to the primer layer using heat lamination. An acrylic pressure sensitive adhesive was used to attach the hologram to the front of the retroreflective sheeting. The article had the following sequential layers: a polyester cover layer, a patterned release coating, a primer layer, a structured hologram, a high-index reflector, a pressure sensitive adhesive tie layer, and a retroreflective layer of the type described in Example Two. The article was applied to a plastic video cassette as a label. When this article was peeled at room temperature, the patterned release coating provided tamper evidence by splitting the hologram layer in the release pattern between the polyester cover layer and retroreflective layer.

Example Five

An article was made to provide a fragile and tamper resistant construction, and included a thin transfer hologram that was hot laminated to the front of a retroreflective sheeting with a patterned release coat. The thin transparent hologram transfer film, such as VT55 available from Crown Roll Leaf, Inc. of Paterson, N.J., consisted of a polyester liner, a polymethyl methacrylate based structured layer, a high-index zinc sulfide reflector, and a thin adhesive. The enclosed microsphere opaque retroreflective sheeting contained a polyethylene-acrylic acid-based tie layer on the front surface of the retroreflective layer from Example Two, which was printed with a release pattern of urethane resin, and then laminated with the thin hologram. The polyester liner was removed from the hologram, and a pressure sensitive adhesive on a silicone liner, available from the 3M Company under the designation pressure sensitive adhesive 9457, was applied to the hologram side as a face adhesive. The finished construction consisted of the silicone liner, pressure sensitive adhesive, structured hologram, a high-index reflector, thin adhesive, urethane-based release pattern, polyethylene-based tie layer, a bead/resin slurry, an aluminum reflector, and a polyolefin backing layer. The silicone liner was peeled from the pressure sensitive adhesive and the construction adhered to the inside window of a vehicle. The hologram and retroreflective layer were visible from the outside of the window. The thin transferred hologram was destroyed by splitting in the release pattern when peeled from the window, so that the label could not be removed and reused in another vehicle. In a different embodiment, the thin adhesive layer on the hologram could be eliminated to simplify the construction.

Example Six

Another article with tamper resistance was made as follows. The thin transfer hologram used in Example Five was laminated to an ethylene acrylic acid-based pattern of adhesion promoter printed on polyvinyl butyral-based retroreflective base from Example Two. The construction had sequential layers of a silicone liner, pressure sensitive adhesive, a structured hologram, high-index reflector, thin adhesive, adhesion promoting pattern, a bead/resin slurry, reflector, and backing. After application to a window, the hologram was destroyed by splitting in the adhesion promoter pattern when peeled.

Example Seven

An article was made by sealing a hologram layer over a retroreflective layer with exposed glass microspheres. A retroreflective layer, as described in U.S. Pat. No. 3,801,183 (Sevelin et al.), was used. The transparent hologram film from Example 1 was sealed over the microsphere layer and attached to a pressure sensitive adhesive surrounding the microsphere area, to provide areas of contact for adhesion, which are adjacent to areas with an air gap over the microspheres to allow retroreflection. The holographic layer does not require a high-index reflector. The construction had sequential layers of a cover layer, a structured layer, a high-index reflector, an air gap between sealed areas of the holographic and retroreflective layers, microspheres, an indicia, high-index reflector on the microspheres, beadbond resin, and an adhesive. A simplified construction would include a structured layer, an air gap, microspheres, a reflector, and beadbond.

Example Eight

A transparent hologram, either the polyester-based film from Example One or a thin transfer film from Example Five, could be laminated over cube corner retroreflective sheeting. Like previous Examples, the hologram would be visible under normal lighting conditions, and the construction would still be retroreflective, because the hologram would not significantly reduce the retroreflective brightness.

Various modifications and combinations of the embodiments disclosed will be apparent to those skilled in the art, and those modifications are intended to be within the scope of the invention as defined in the appended claims.

We claim:

1. An article comprising:
   (a) a transparent holographic layer perceptible under normal lighting conditions, and substantially imperceptible to the unaided eye under retroreflective lighting conditions;
   (b) a retroreflective layer, comprising a multiplicity of cube corner retroreflective elements, that is perceptible under retroreflective lighting conditions; and
   (c) an indicia layer.

2. The article of claim 1, wherein the article further includes at least one of a cover film, a tie layer, an adhesive layer, a heat-shrink layer, and a patterned coating layer with differential adhesion.

3. The article of claim 1, wherein the article includes more than one of a cover film, a tie layer, an adhesive layer, a heat-shrink layer, and a patterned coating layer with differential adhesion.

4. The article of claim 1, wherein the article includes a holographic layer comprising a structured layer on an exposed surface of the article.

5. The article of claim 1, wherein the article includes a holographic layer comprising a structured layer and a substantially transparent reflector layer.

6. The article of claim 5, wherein the transparent reflector layer is a discontinuous pattern of reflective material.

7. The article of claim 5, wherein the transparent reflector layer is a material with a higher refractive index than the structured layer.

8. The article of claim 5, wherein the indicia layer is formed on the cube corner portions of the retroreflective layer, and is substantially imperceptible to the unaided eye under normal lighting conditions, but is perceptible under retroreflective lighting conditions.

9. The article of claim 8, wherein the indicia is a pattern of reflective material that contrasts in brightness with its background under retroreflective lighting conditions.

10. The article of claim 9, further including an adhesive layer for bonding the article to a surface.

11. The article of claim 8, wherein the indicia is a pattern of non-reflective material that contrasts in brightness with its background under retroreflective lighting conditions.

12. The article of claim 1, wherein the indicia layer is disposed between the holographic and retroreflective layers.

13. The article of claim 1, wherein the holographic layer is between the indicia layer and the retroreflective layer.

14. The article of claim 1, wherein the retroreflective layer is between the holographic layer and the indicia layer.

15. The article of claim 1, wherein the indicia layer is disposed between the holographic layer and the retroreflective layer so that the indicia is substantially imperceptible to the unaided eye under normal lighting conditions, but is perceptible under retroreflective lighting conditions.

16. The article of claim 15, wherein the retroreflective layer contains a continuous reflector on the cube corner portions of the retroreflective layer, which is bright under retroreflective lighting conditions and dark under normal lighting conditions.

17. The article of claim 16, further including an adhesive layer for bonding the article to a surface.

18. The article of claim 17, further including a patterned differential adhesion layer disposed between the retroreflective layer and the adhesive layer.

19. An article comprising:
   (a) a transparent holographic layer perceptible under normal lighting conditions, and substantially imperceptible to the unaided eye under retroreflective lighting conditions;
   (b) a retroreflective layer that is perceptible under retroreflective lighting conditions; and
   (c) an indicia layer;
   (d) a patterned differential adhesion layer; and
   (e) an adhesive layer underlying the patterned differential adhesion layer, to bond the article to a surface.

* * * * *